United States Patent [19]
Hayami et al.

[11] Patent Number: 6,064,002
[45] Date of Patent: May 16, 2000

[54] ELECTRICALLY INSULATED CABLE AND ARRANGEMENT FOR CONNECTING THE CABLE

[75] Inventors: Hiroshi Hayami; Kiyoaki Moriuchi; Satoshi Ebina, all of Osaka, Japan

[73] Assignee: Sumitomo Electric Industries, Ltd., Osaka, Japan

[21] Appl. No.: 08/942,842

[22] Filed: Oct. 3, 1997

[30] Foreign Application Priority Data

Oct. 3, 1996 [JP] Japan .................................. 8-263246
Sep. 10, 1997 [JP] Japan .................................. 9-245475

[51] Int. Cl.[7] ............................ H02G 3/08; H02B 1/30
[52] U.S. Cl. ................................... 174/52.1; 174/61
[58] Field of Search ................. 174/52.1, 63; 525/440; 428/379, 383

[56] References Cited

PUBLICATIONS

Dialog (R) File 352:Derwent WPI, Nov. 27, 1997, p. 187, Item 59 of 77.
Dialog (R) File 352:Derwent WPI, Nov. 27, 1997, p. 116, item 16 of 77.
Dialog (R) File 352:Derwent WPI, Nov. 27, 1997, p. 99, Item 6 of 77.
Dialog (R) File 352:Derwent WPI, Nov. 27, 1997, p. 112, Item 14 of 77.
Dialog (R) File 352:Derwent WPI, Nov. 27, 1997, p. 16, Item 11 of 64.

*Primary Examiner*—Dean A. Reichard
*Assistant Examiner*—William H Mayo, III
*Attorney, Agent, or Firm*—Pillsbury Madison & Sutro LLP

[57] ABSTRACT

An electrically insulated cable having a sheath made of a material which is heat-fusible to a polyamide or polyester resin so that a highly waterproof joint portion can be formed between the cable and a housing simultaneously when the housing is injection-molded from a polyamide or polyester resin. The sheath is made from a crosslinked resin composition comprising a thermoplastic polyurethane elastomer and a thermoplastic polyester elastomer mixed together in a weight ratio of 80:20 to 20:80. A housing is provided around one end of the sheath of this cable by injection-molding polyamide or polyester engineering plastics to fuse the sheath to the housing, thereby hermetically sealing the interface between the cable and the housing. The sheath may be made from a crosslinked resin composition comprising a thermoplastic polyurethane elastomer and a thermoplastic polyamide elastomer mixed together in a weight of 80:20 to 10:90. It is possible to seal the cable to a housing made of polyamide engineering plastics.

8 Claims, 3 Drawing Sheets

ELECTRICALLY INSULATED CABLE AND ARRANGEMENT FOR CONNECTING THE CABLE

This application is based on Japanese Patent Application 8-263246 filed on Oct. 3, 1996 and Japanese Patent Application 9-245475 filed on Sep. 10, 1997, the content of which is incorporated into the present application by reference.

BACKGROUND OF THE INVENTION

This invention relates to an electrically insulated cable having a sheath that is heat-fusible to polyamide or polyester resin, and a connecting arrangement that makes it possible to form a highly reliable waterproof joint between the abovementioned cable and a housing made of polyamide or polyester resin at a low cost.

With the advancement in car electronics, today's cars are equipped with various control systems including antilock brake systems (ABS). Most of such control systems comprise sensors for converting physical quantities such as temperature, speed, pressure, etc. into electric signals, an ECU (electric control unit) for processing signals from the sensors, and actuators controlled by the signals from the ECU. Sensors for an ABS are wheel rotation speed sensors provided near the vehicle wheels for converting wheel speed information into electric signals, which are inputted in the ECU. The ECU processes the signals inputted and produces electric output signals, which are transmitted through cables to actuators to activate them.

Such wheel speed sensors include electromagnetic pickup sensors and Hall-effect sensors. Since wheel speed sensors are exposed to water while the vehicle is traveling, not only the sensors themselves but the joints between the sensors and cables have to be sufficiently water-resistant.

The housing for a wheel speed sensor is typically made from engineering plastics such as PBT (polybutylene terephthalate) resin, 6-nylon resin, 6, 6-nylon resin, and 6T-nylon (aromatic nylon) for higher dimensional accuracy and mechanical strength, and better moldability.

As a cable (sensor cable) for connecting each wheel speed sensor to the ECU, one shown in FIG. 2 is used which comprises insulated wires a having a conductor covered with an insulator made of polyvinyl chloride or flame-retardant polyethylene, and a sheath b covering the insulated wires a, or one shown in FIG. 3, in which an intermediate layer c is provided between the insulated wires a and the sheath b. The sheath of such a cable A is ordinarily made from a crosslinked thermoplastic polyurethane elastomer composition for higher flexibility, abrasion resistance, bend resistance, water resistance, etc. Such a sheath cannot be heat-fused to the abovementioned engineering plastics, so that the sensor cable joint portion has to be waterproofed with a separate seal member.

FIG. 4 shows a conventional joint between a wheel speed sensor and a cable. As shown, the sensor and the cable are connected together by injection-molding the housing H with a seal member B such as an O-ring fitted around the cable A. This joint structure is expensive because it needs an extra seal member such as an O-ring and an extra step of fitting the seal member around the cable.

As a solution to this problem, in a conventional arrangement (disclosed in Japanese patent application 7-194480), a sensor housing is injection-molded from PBT resin. During injection molding, the housing is heat-fused to a cable having its sheath made from a crosslinked thermoplastic polyester elastomer to waterproof the joint portion.

But a cable sheath made from a crosslinked thermoplastic polyester elastomer is not heat-fusible to a housing made from polyamide engineering plastics such as 6-nylon, 6, 6-nylon, etc. Thus, the joint portion therebetween cannot be waterproofed sufficiently. As a result of long-term endurance test, it has been found out that if a housing made from polyester engineering plastics such as polybutylene terephthalate (PBT) resin is used, too, water resistance tends to drop.

An object of this invention is to provide a cable having a sheath made of a material which is heat-fusible to a member made of polyamide engineering plastics so that the interface therebetween can be sealed at a low cost.

Another object of the present invention is to provide a cable which has an improved long-term waterproofness to a housing made of polyester engineering plastics.

SUMMARY OF THE INVENTION

The inventors of the present application have found out the following:

1) A cable sheath made from a crosslinked resin composition mainly comprising a mixture of a thermoplastic polyurethane elastomer and a thermoplastic polyester elastomer at a weight ratio of 80:20 to 20:80 is heat-fusible to a housing made from polyamide engineering plastics with good water resistance of the joint portion between the cable and the housing, while maintaining various properties required for a sensor cable such as high abrasion resistance.

If a polyester engineering plastic is used as a housing material, a joint can be formed which can maintain water resistance for a longer time than if the sheath is made from a resin composition comprising thermoplastic polyester elastomer only.

2) A cable sheath made from a crosslinked resin composition mainly comprising a mixture of a thermoplastic polyurethane elastomer and a thermoplastic polyamide elastomer at a weight ratio of 80:20 to 10:90 is heat-fusible to a housing made from polyamide engineering plastics with good water resistance of the joint portion between the cable and the housing, while maintaining various properties required for a sensor cable such as high abrasion resistance.

By forming a cable sheath from a crosslinked resin composition comprising a mixture described in 1) or 2) with a flame-retardant other than polybromodiphenyl ether added to improve flame retardancy, it is further possible to improve flame retardancy of the cable. The present invention has been made based on these findings.

The thermoplastic polyurethane elastomer used in the present invention is a block copolymer of a hard segment of a polyurethane formed by condensation-polymerizing a diisocyanate such as tolylene diisocyanate and a short-chain diol such as ethylene glycol, and a soft segment of a bifunctional polyol. According to the type of the soft segment (bifunctional polyol), there are different kinds of polymers such as polyether, caprolactone ester, adipate and polycarbonate ester polymers.

The thermoplastic polyester elastomer used in the present invention is a block copolymer of crystalline hard segment such as PBT resin, and an amorphous soft segment comprising a polyoxymethylene glycol such as polytetramethylene ether glycol, or an amorphous soft segment of a polyester glycol such as polycaprolactone glycol. For higher flexibility of the resin composition, thermoplastic polyester elastomer whose soft segment is polyoxymethyleneglycol, that is, a polyether based elastomer is preferable.

The thermoplastic polyamide elastomer used in the present invention should be a block copolymer of crystalline hard segment such a 6-nylon, 11-nylon or 12-nylon and an amorphous soft segment comprising polyoxymethyleneglycol such as polytetramethyleneetherglycol for good flexibility of the resin composition.

The weight ratio of the thermoplastic polyurethane elastomer to the thermoplastic polyester elastomer is 80:20 to 20:80. If the content of thermoplastic polyurethane elastomer is over 80 wt %, this composition will not be sufficiently fusible to polyamide or polyester engineering plastics. The same is true if the content of thermoplastic polyester elastomer is over 80 wt %.

The weight ratio of the thermoplastic polyurethane elastomer to the thermoplastic polyamide elastomer is 80:20 to 10:90. If the content of thermoplastic polyurethane elastomer is over 80 wt %, this composition will not be sufficiently heat-fusible to polyamide engineering plastics. The same is true if the content of thermoplastic polyamide elastomer is over 90 wt %.

If the cable according to the invention is sealed to a housing while forming the housing by injection-molding polyamide engineering plastics such as 6-nylon or 6,6-nylon, the sheath of the cable will melt and lose its shape because the molding temperature of polyamide engineering plastics, which is about 240–320° C., is higher than the softening or melting temperature of the mixture of thermoplastic polyurethane elastomer and thermoplastic polyester elastomer or the mixture of thermoplastic polyurethane elastomer and thermoplastic polyamide elastomer.

Also, if the cable according to the invention is sealed to a housing while forming the housing by injection-molding polyester engineering plastics such as PBT, a similar problem will arise because the molding temperature of polyester engineering plastics, which is about 240–300° C., is higher than the softening or melting temperature of the mixture of thermoplastic polyurethane elastomer and thermoplastic polyester elastomer.

This problem is solvable by crosslinking the sheath material, i.e. the mixture of thermoplastic polyurethane elastomer and thermoplastic polyester elastomer or the mixture of thermoplastic polyurethane elastomer and thermoplastic polyamide elastomer. Crosslinking is carried out e.g. by incorporating a multifunctional monomer having carbon-carbon double bonds in a molecule such as trimethylolpropane trimethacrylate, triallyl cyanurate, or triallyl isocyanurate, and irradiating this material with ionizing radiations such as accelerated electron beams or gamma rays. The thus crosslinked sheath can retain its shape even if exposed to temperatures higher than its melting point.

Other feasible methods of crosslinking the mixture of thermoplastic polyurethane elastomer and thermoplastic polyester elastomer or the mixture of thermoplastic polyurethane elastomer and thermoplastic polyamide elastomer include heat curing using organic peroxides, and "water" crosslinking in which alcoxysilane is grafted to either of the abovementioned mixtures, and this material is crosslinked by bringing it into contact with water or vapor in the presence of such a catalyst as an organic tin compound. But the crosslinking by irradiation of ionizing radiations such as accelerated beams is quicker, more convenient, and higher in productivity.

The mixture of thermoplastic polyurethane elastomer and thermoplastic polyester elastomer or the mixture of thermoplastic polyurethane elastomer and thermoplastic polyamide elastomer is combustible. Thus, in order to use this material for the cable sheath or its intermediate layer, this mixture has to be made incombustible by e.g. adding flame-retardants such as halogen-containing organic flame-retardants including polybromodiphenyl ether, ethylene-bis-brominated phthalimide, bis (brominated phenyl) ethane, bis (brominated phenyl) terephthalamide and perchloropentacyclodecan, phosphorus- or nitrogen-based organic flame-retardants, antimony trioxide, aluminum hydroxide, or magnesium hydroxide. A cable having a sheath or intermediate layer made from the resin composition that has been made incombustible in the above manner is safe enough to pass a combustion test under JASO (Japan Automobile Standard Organization).

The fusing strength of the polyamide thermoplastic engineering plastics used as a material for the housing to the cable sheath is influenced by the kinds of the flame retardant added to the mixture of thermoplastic polyurethane elastomer and thermoplastic polyester elastormer or the mixture of thermoplastic polyurethane elastomer and thermplastic polyamide elastomer. If the flame-retardant used is ethylene-bis-brominated phthalimide, bis(brominated phenyl) ethane, or bis(brominated phenyl) terephthalamide, the cable sheath is strongly fusible to the housing made of a polyamide resin or a polyester resin. But if the flame-retardant added is a polybromodiphenyl ether such as decabromodiphenyl ether or octabromodiphenyl ether, the fusing strength of the housing to the cable sheath will be insufficient.

The fusing strength of the polyester thermoplastic engineering plastics used as a material for the housing to the cable sheath is influenced by the kinds of the flame retardant added to the mixture of thermoplastic polyurethane elastomer and thermoplastic polyester elastomer. If the flame-retardant used is ethylene-bis-brominated phthalimide, bis (brominated phenyl) ethane, or bis(brominated phenyl) terephthalamide, the cable sheath is strongly fusible to the housing made of a polyester resin. But if the flame-retardant added is a polybromodiphenyl ether such as decabromodiphenyl ether or octabromodiphenyl ether, the fusing strength of the housing to the cable sheath will be insufficient.

The higher the degree of crosslinking of the resin composition material for the cable sheath, the greater the influence of the kind of flame-retardant used on the fusing strength. As described above, taking into consideration the injection molding temperature of polyamide or polyester engineering plastics, it is necessary to crosslink the cable sheath. But with a sheath made of a resin composition to which is added a polybromodiphenyl ether such as decabromodiphenyl ether as a flame-retardant, if the degree of crosslinking of the resin composition material for the cable sheath is increased to such a level that the shape of the sheath is maintained during molding, it becomes difficult to fuse the sheath to the housing with sufficient strength, so that the water resistance deteriorates markedly.

In contrast, in case the flame-retardant is ethylene-bis-brominated phtahlimide, bis(brominated phenyl) ethane, or bis(brominated phenyl) terephthalamide, even if the degree of crosslinking of the cable sheath is increased to such a level that the shape of the sheath is maintained during injection molding of polyamide or polyester engineering plastics, the sheath can be fused strongly to the housing, so that the joint portion is sufficiently waterproofed.

A resin composition comprising as a major component the mixture of thermoplastic polyurethane elastomer and thermoplastic polyester elastomer or the mixture of thermoplastic polyurethane elastomer and thermoplastic polyamide elastomer may include a known thermoplastic resin or thermoplastic elastomer so long as its content is in such a range as not to impair other properties. To such a resin composition may be added stabilizers such as antioxidants, light stabilizers or hydrolysis inhibitors, or other known chemicals such as reinforcers, fillers or colorants. The raw materials can be mixed together with a known mixer such as a Banbury mixer, pressure kneader, single-screw mixer, twin-screw mixer or open roll mixer.

Other features and objects of the present invention will become apparent from the following description made with reference to the accompanying drawings, in which:

DETAILED DESCRIPTION OF THE PREFERRED EMBODIMENT

This invention is described in more detail by the following embodiments.

Figure 1:
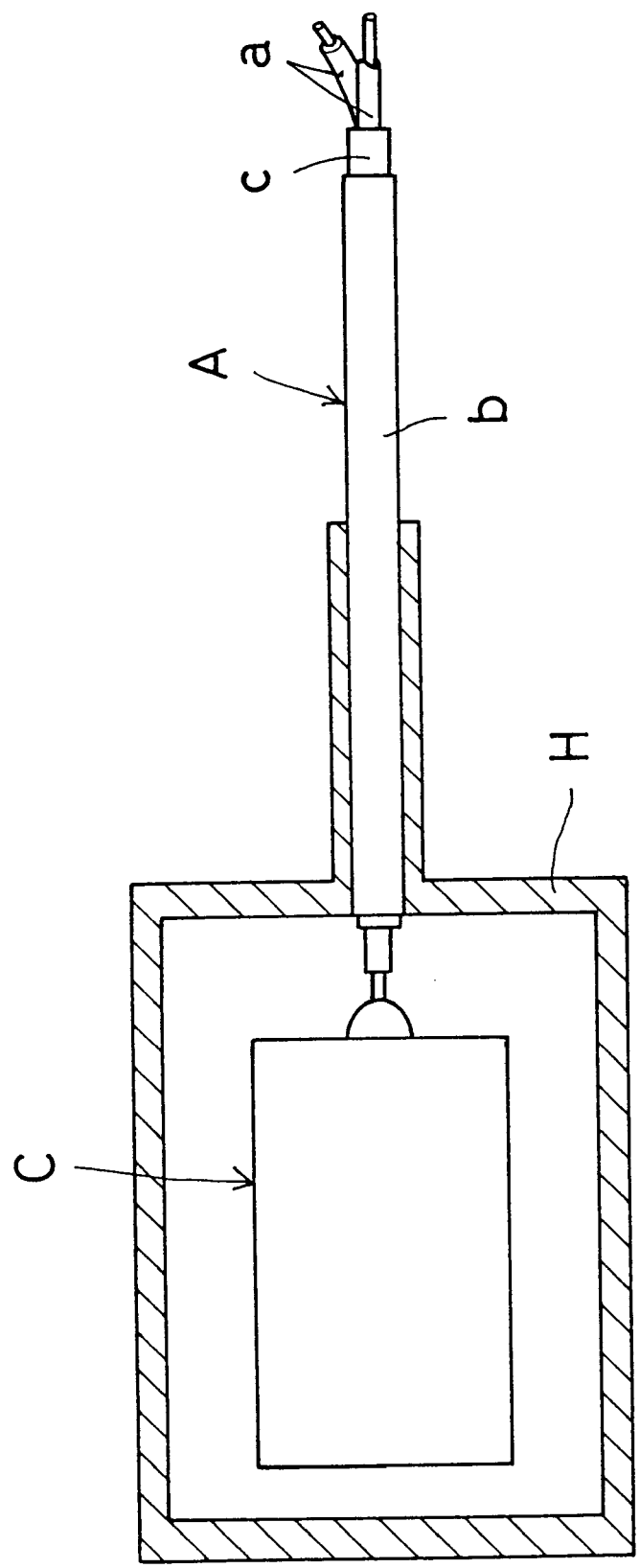
FIG. 1 is a sectional view of an example in which a it water proof joint portion is formed between the cable according to this invention and a wheel speed sensor housing.

FIG. 1 shows an electrically insulated cable A according to this invention. The cable has insulated electric wires a. With the wires connected to output terminals of a sensor (such as a wheel speed sensor C shown), a housing H for sealing the sensor is formed by injection-molding polyamide engineering plastics or polyester engineering plastics. Simultaneously the end of the cable A is enclosed with the housing and the sheath b of the cable is fused to the housing H.

The sheath b of the cable A is formed from a crosslinked resin composition obtained by mixing a thermoplastic polyurethane elastomer and a thermoplastic polyester elastomer in the weight ratio of 80:20 to 20:80 or mixing a thermoplastic polyurethane elastomer and a thermoplastic polyamide elastomer in the weight ratio of 80:20 to 10:90.

Figure 2:
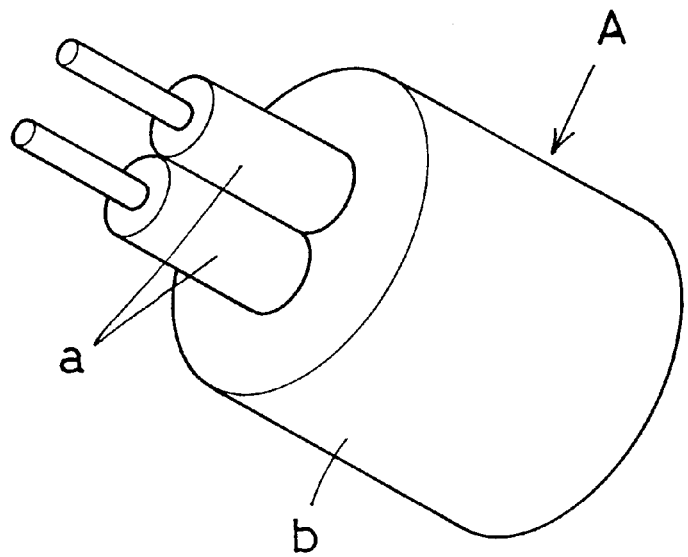
FIG. 2 is a perspective view of a cable on which the improvement according to this invention is to be made.
Figure 3:
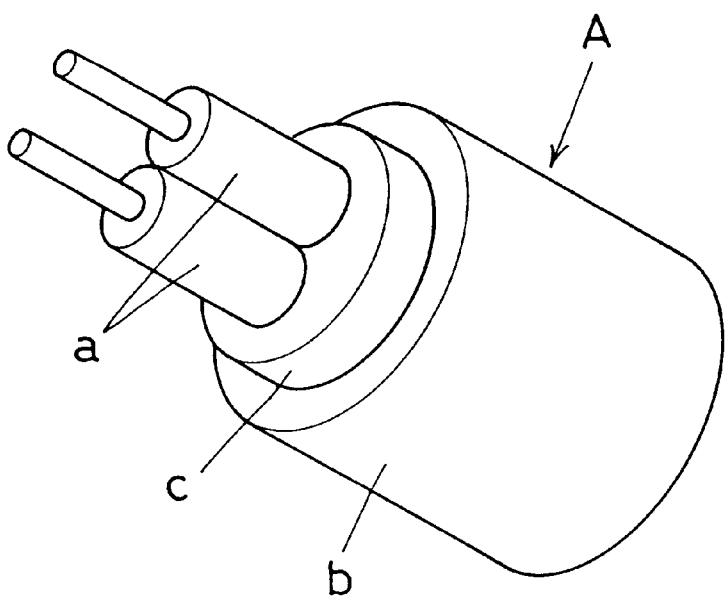
FIG. 3 is a perspective view of another type of cable.
Figure 4:
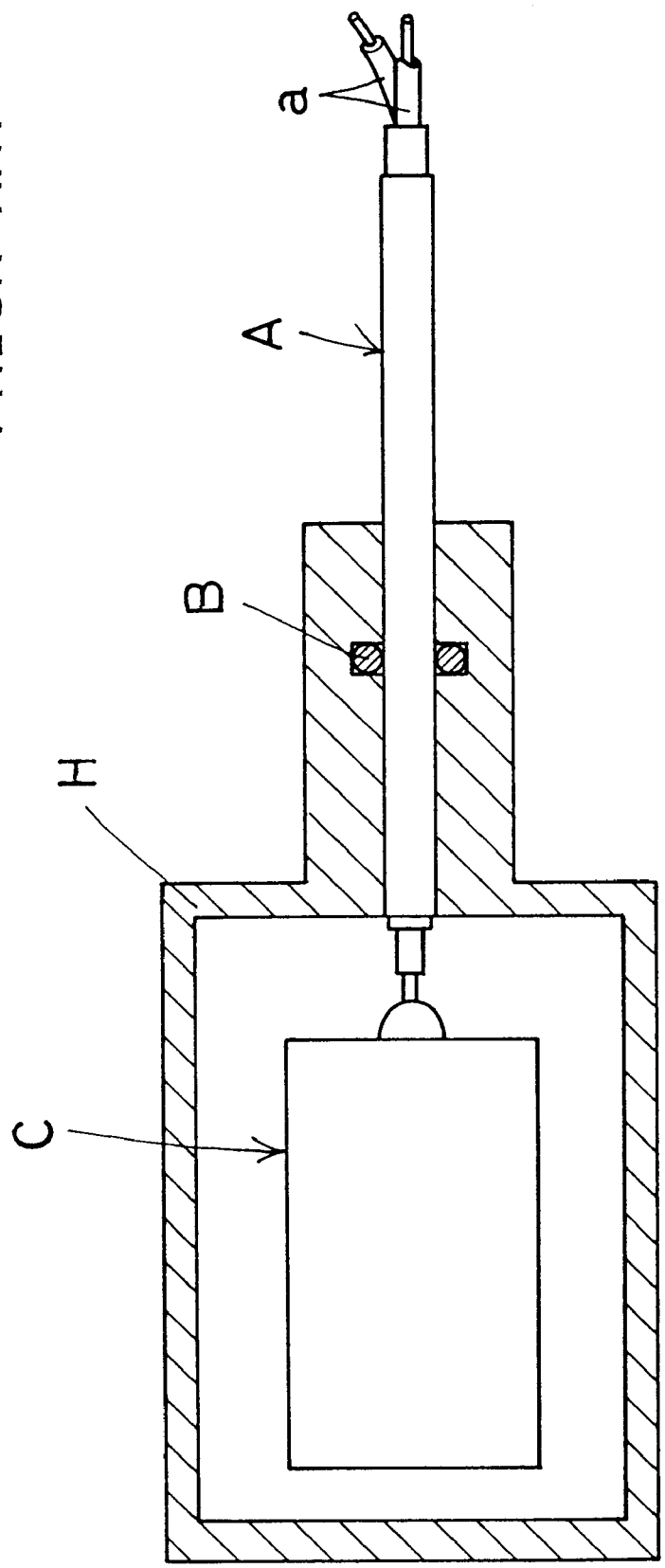
FIG. 4 is a sectional view of a waterproof joint portion between a conventional cable and a wheel speed sensor housing.

The cable according to this invention may be one with a single insulated wire (single-core cable), one with a plurality of insulated wires (multi-core cable), one without an intermediate layer as shown in FIG. 2, or one with an intermediate layer c as shown in FIG. 3.

Detailed examples are described below:

EXAMPLES

Cables embodying this invention (Examples of the invention 1–32) and cables for comparison (comparative Examples 1–26) were prepared and the performance of their sheaths was tested.

In order that the sheath can be readily peeled, the cable of each example had an intermediate layer (a in FIGS. 1 and 3) made of a thermoplastic resin having a melt index (at 190° C., under 2160 g load) of 0.2 or over, more particularly, an ethylene-vinyl acetate copolymer having a melt index of 5. A material having a melt index not less than 0.2 was selected as a material for an intermediate layer because this material can be co-extruded together with a thermoplastic resin composition used to mold the cable sheath.

The components shown in Tables 1–15 were mixed at 190° C. by use of a twin screw type mixer and pelletized. Besides the components shown in the tables, each resin composition contained 1 part by weight of a diphenylamine antioxidant, and 5 parts by weight of trimethylolpropane trimethacrylate. To any resin composition requiring a flame-retardant is further added 15 parts by weight of antimony trioxide was added.

Cables were formed as follows: two insulated wires (Irrax B8 made by Sumitomo Electric Industries, Ltd.) each comprising a copper alloy conductor 3/20/0.08 and an insulating layer having an outer diameter of 1.7 mm were twisted together at a 35 mm pitch; a resin composition (for an intermediate layer) mainly comprising ethylene-vinyl acetate copolymer (20 wt % vinyl acetate, melt index: 5) and each of the resin compositions (for sheath) shown in Tables 1–15 were co-extruded onto the twisted wires by a melt extruder (40 mm diameter; ratio of screw length L to screw diameter D, i.e. L/D=24) and a melt extruder (60 mm diameter; L/D=24), respectively, to form an intermediate layer having an outer diameter of 4.0 mm and a sheath layer having an outer diameter of 5.0 mm, respectively; the layers thus formed were irradiated with 2 MeV electron beam for crosslinking.

Each cable specimen had its sheath and intermediate layer stripped at one end thereof, the insulator at the tip of the insulated conductor stripped, and the conductors were connected to terminals of a sensor. Then, with the sensor and the cable fixed in a mold, resin for the housing was injection-molded in the following manner.

For cables of Examples 1–20 and Comparative Examples 1–16, 6,6-Nylon resin (2020 GC4 made by UBE Industries, Ltd.) was molded at a resin temperature of 290° C. For cables of Examples 21–32 and Comparative Examples 17–26, PBT resin (PBT 1101G-30 made by TORAY Industries, Inc.) was molded at 280° C.

Each of the thus formed cable-sensor assemblies was evaluated for the fusing strength between the cable and the housing as follows. For the initial properties, the assemblies (five for each example) were immersed in water kept at room temperature with a small amount of an anionic surface active agent added for 24 hours, and the insulating resistance between the conductors of the cable and water (measuring voltage: DC 500 V) was measured with the assemblies kept immersed in water. Those with 100 MΩ or over were judged to be passable.

To evaluate post-heat shock (heat cycle) properties, the cable-sensor assemblies (five for each example) were subjected to 100-cycle heat shocks, each cycle consisting of leaving the assemblies in an environment of −40° C. for an hour, and then leaving them at 120° C. for an hour. Then, the assemblies were immersed in water kept at room temperature with a small amount of an anionic surface active agent added for 24 hours. Thereafter, with the assemblies kept immersed in water, the insulating resistance between the conductors of each cable and water (measuring voltage: DC 500 V) was measured. Those with 100 MΩ were judged to be passable as in the first test.

For the five specimens of any example that had all been judged to be passable in the 100-cycle heat shock test, the heat shock test was extended to 1000 cycles. At the end of the test, the insulating resistance was measured and judgment was made on whether each specimen was passable.

For specimens which used PBT resin as the housing material and used as a sheath material a crosslinked resin composition comprising as a main component a mixture of thermoplastic polyurethane elastomer and thermoplastic polyester elastomer, they were subjected to 300 and 500 cycle heat shock tests in addition to the abovementioned tests. After measuring the insulation resistance, judgement was made on whether or not each specimen was passable.

The test results are summed up below:

Test Results

In the Examples 1–10 and Comparative Examples 1–10, cables having a sheath made of a crosslinked resin composition comprising a mixture of thermoplastic polyurethane elastomer and thermoplastic polyester elastomer were used and the housing was formed by injection molding 6, 6-Nylon resin.

Examples of the Invention 1–8

Examples of the Invention 1–8 have their cable sheaths made from a resin composition in which a thermoplastic polyurethane elastomer and a thermoplastic polyester elastomer are mixed together in the ratio (weight) of 80:20–20:80. As shown in Tables 1 and 2, all the five specimens of any example passed the waterproof test at initial and after 100-cycle heat shock. Also, all the five specimens of an example in which a thermoplastic polyurethane elastomer and a thermoplastic polyester elastomer were mixed together in the ratio of 70:30 to 40:60 passed the test after 1000-cycle heat shock. This indicates that these specimens are especially high in water resistance.

Comparative Example 1

The specimens of Comparative Example 1 have their cable sheaths made from a resin composition whose base polymer is a thermoplastic polyurethane elastomer whose soft segment is polyester based. Apparently, the cable sheaths were fused to the housings. But three out of the five specimens failed the waterproof test in which the insulating resistance was measured (see Table 3).

Comparative Examples 2–4

In Comparative Examples 2–4, cable sheaths were made from a flame-retarded resin composition whose base polymer is a thermoplastic polyurethane elastomer whose soft segment is polyester, polyether and polycarbonate ester based, respectively. As shown in Table 3, many specimens failed the waterproof test in the initial stage. It is thus apparent that these specimens have no expected waterproofness.

Comparative Example 5

In Comparative Example 5, cable sheaths were made from a resin composition comprising a thermoplastic polyester elastomer whose soft segment is polyether based. By the outer look, the cable sheaths were not fused to the housings at all. Thus, all the five specimens failed the waterproof test as shown in Table 4.

Comparative Examples 6–8

In Comparative Examples 6 and 7, cable sheaths were made from a resin composition comprising a flame-retarded thermoplastic polyester elastomer whose soft segment is polyether based. In Comparative Example 8, cable sheaths were made from a resin composition comprising a flame-retarded thermoplastic polyester elastomer whose soft segment is polyester based. As seen in Table 4, many of the specimens of these examples failed the waterproof test from the beginning of the test.

Examples of the Invention 9 and 10

In these Examples, cable sheaths were made from a resin composition comprising a mixture of a thermoplastic polyurethane elastomer and a thermoplastic polyester elastomer and flame-retarded by adding octabromodiphenyl ether and decabromodiphenyl ether. Although the mixing ratio of the thermoplastic polyurethane elastomer and the thermoplastic polyester elastomer met the conditions of the invention, the flame-retardants were not suitable. Thus, many specimens failed the waterproof test after 100-cycle heat shock, though all the specimens passed the initial waterproof test. Thus, these specimens are not waterproof enough.

Comparative Example 9

In Comparative Example 9, cable sheaths were made from a resin composition comprising a flame-retarded mixture of a thermoplastic polyurethane elastomer and a thermoplastic polyester elastomer mixed together in the ratio (weight) of 90:10. Three out of five specimens of this example failed the waterproof test in the initial stage (see Table 5). Their water resistance was insufficient.

Comparative Example 10

In Comparative Example 10, cable sheaths were made from a resin composition comprising a flame-retarded mixture of a thermoplastic polyurethane elastomer and a thermoplastic polyester elastomer mixed together in the ratio (weight) of 10:90. Four out of the five specimens of this example failed the waterproof test in the initial stage (see Table 5). Their water resistance was insufficient.

In the Examples 11–20 and Comparative Examples 11–16, cables having a sheath made of a crosslinked resin composition comprising a mixture of thermoplastic polyurethane elastomer and thermoplastic polyamide elastomer were used and the housing was formed by injection molding 6, 6-Nylon resin.

Examples of the Invention 11–18

Examples of the Invention 11–18 have their cable sheaths made from a resin composition in which a thermoplastic polyurethane elastomer and a thermoplastic polyamide elastomer are mixed together in the ratio (weight) of 80:20–10:90. As shown in Tables 6 and 7, all the five specimens of any Example passed the waterproof test at initial and after 100-cycle heat shock. Also, all the five specimens of any Example in which a thermoplastic polyurethane elastomer and a thermoplastic polyamide elastomer were mixed together in the ratio of 70:30 to 20:80 passed the 1000-cycle heat shock test. This indicates that these specimens are especially high in water resistance.

Comparative Example 11

The specimens of Comparative Example 11 have their cable sheaths made from a resin composition which comprises a thermoplastic polyamide elastomer only. Apparently, the cable sheaths were not fused to the housings on some specimens. And three out of the five molded specimens failed the waterproof test in which the insulating resistance was measured (see Table 8).

Comparative Examples 12–14

In Comparative Examples 12–14, cable sheaths were made from a flame-retarded resin composition which comprises a thermoplastic polyamide elastomer. As shown in Table 8, many specimens failed the waterproof test in the initial stage. It is thus apparent that these specimens had no expected water resistance.

Examples of the Invention 19 and 20

In these Examples, cable sheaths were made from a resin composition comprising a mixture of a thermoplastic polyurethane elastomer and a thermoplastic polyamide elastomer and flame-retarded by adding octabromodiphenyl ether and decabromodiphenyl ether. Many specimens failed the waterproof test after 100-cycle heat shock, though all the specimens passed the initial waterproof test. Thus, these specimens are not waterproof enough.

Comparative Examples 15 and 16

In Comparative Examples 15 and 16, cable sheaths were made from a resin composition comprising a flame-retarded mixture of a thermoplastic polyurethane elastomer and a thermoplastic polyamide elastomer mixed together in the ratio (weight) of 90:10 and 5:95. Three or four out of five specimens of these Examples failed the waterproof test in the initial stage (see Table 9). Their water resistance was insufficient.

In the Examples 21–32 and Comparative Examples 17–26, cables having a sheath made of a crosslinked resin composition comprising a mixture of thermoplastic polyurethane elastomer and thermoplastic polyester elastomer were used and the housing was formed by injection molding PBT resin.

Examples of the Invention 21–28

Examples of the Invention 21–28 have their cable sheaths made from a resin composition in which a thermoplastic polyurethane elastomer whose soft segment is polyether based and a thermoplastic polyester elastomer whose soft segment is polyether or polyester based are mixed together in the ratio (weight) of 80:20–20:80. As shown in Tables 10 and 11, all the five specimens of any Example passed the waterproof test at initial and after 100-cycle, 300-cycle and 500-cycle heat shock. Also, all the five specimens of an example in which a thermoplastic polyurethane elastomer and a thermoplastic polyester elastomer were mixed together in the ratio of 70:30 to 40:60 passed the 1000-cycle heat shock test. This indicates that these specimens are especially high in water resistance.

Comparative Example 17

The specimens of Comparative Example 17 have their cable sheaths made from a resin composition comprising a thermoplastic polyurethane elastomer whose soft segment is polyether based. Apparently, the cable sheaths were fused to the housings. But two out of the five specimens failed the waterproof test in which the insulating resistance was measured (see Table 12).

Comparative Examples 18–20

In Comparative Examples 18–20, cable sheaths were made from a flame-retarded resin composition whose base polymer is a thermoplastic polyurethane elastomer whose soft segment is polyether, polyester and polycarbonate ester based, respectively. As shown in Table 12, many specimens failed the waterproof test in the initial stage. It is thus apparent that these specimens have no expected water resistance.

Comparative Example 21

In Comparative Example 21, cable sheaths were made from a resin composition comprising a thermoplastic polyester elastomer whose soft segment is polyether based. The specimens passed the waterproof test at initial and after 100-, and 300-cycle heat shock, but two out of five specimens failed the test after 500-heat cycle. This indicates that expected water resistance was not obtained (see Table 13).

Comparative Examples 22–24

In Comparative Examples 22–24, cable sheaths were made from a resin composition comprising a thermoplastic polyester elastomer whose soft segment is polyether or polyester based. As shown in Table 13, the specimens passed the waterproof test at initial and after 100-, and 300-cycle heat shock, but many of them failed the test after 500-heat cycle. This indicates that expected water resistance was not obtained.

Examples of the Invention 29–32

In these Examples, cable sheaths were made from a resin composition comprising a mixture of a thermoplastic polyurethane elastomer whose soft segment is polyether or polyester based and a thermoplastic polyester elastomer whose soft segment is polyether or polyester based and flame-retarded by adding octabromodiphenyl ether and decabromodiphenyl ether. Although the mixing ratio of the thermoplastic polyurethane elastomer and the thermoplastic polyester elastomer met the conditions of the invention, the flame-retardants were not suitable. Thus, as shown in Table 14, many specimens failed the waterproof test after the 100-cycle heat shock, though all the specimens passed the initial waterproof test. Thus, these specimens were not waterproof enough.

Comparative Example 25

In Comparative Example 25, cable sheaths were made from a flame-retarded resin composition comprising a thermoplastic polyurethane elastomer whose soft segment is polyether based and a thermoplastic polyester elastomer whose soft segment is polyether based in the weight ratio of 90:10. The specimens passed the waterproof test at initial and after 100-, and 300-cycle heat shock, but many of them failed the test after 500-heat cycle. This indicates that expected water resistance was not obtained (see Table 15).

Comparative Example 26

In Comparative Example 26, cable sheaths were made from a flame-retarded resin composition comprising a thermoplastic polyurethane elastomer whose soft segment is polyether based and a thermoplastic polyester elastomer whose soft segment is polyether based in the weight ratio of 10:90. The specimens passed the waterproof test at initial and after 100-, and 300-cycle heat shock, but two out the five specimens many of them failed the test after 500-heat cycle. This indicates that expected water resistance was not obtained (see Table 15).

As will be apparent from these experiment results, by using a resin composition comprising a mixture of a thermoplastic polyurethane elastomer and a thermoplastic polyester elastomer or mixture of thermoplastic polyurethane elastomer and thermoplastic polyamide elastomer mixed together in ratio within the above-defined range, it is possible to strongly fuse the cable to the housing when the housing is injection-molded from polyamide engineering plastics. The joint portion between the cable and the housing is thus completely waterproofed.

If a resin composition comprising a mixture of a thermoplastic polyurethane elastomer and a thermoplastic polyester elastomer mixed together in ratio within the predetermined range is used as the sheath material, better water resistance is obtainable, when the housing is injection-molded from polyester engineering plastics than if a resin composition comprising a thermoplastic polyester elastomer only is used.

One will assume that to a housing formed of polyamide or polyester engineering plastics, a resin composition comprising a thermoplastic polyamide elastomer only or a resin composition comprising a thermoplastic polyester elastomer only is heat-fusible more easily. The present inventors have found out that on the contrary to such an assumption, a resin composition comprising one of the abovementioned mixtures of elastomers provides better water resistance. This is a new and novel finding.

To such a resin composition may be added flame-retardants other than polybromodiphenyl ether such as ethylene-bis-brominated phthalimide, bis(brominated phenyl) ethane, or bis(brominated phenyl) terephthalamide to give the cable flame-retardancy without impairing the fusibility to the housing.

The electrically insulated cable according to this invention has its sheath made from resin composition modified so as to be fusible to a polyamide resin or a polyester resin. Thus, it is possible to improve the reliability of a waterproof joint portion formed when a sealing member is integrally molded from a polyamide resin or a polyester resin, and to reduce the assembling steps and cost. For example, when a cable is integrally molded simultaneously when a housing for a wheel speed sensor is formed, it is possible to form a highly waterproof joint portion simply by injection-molding the housing from polyamide or polyester engineering plastics. This technique is advantageously used for e.g. automotive parts.

The foregoing detailed description of the preferred embodiments of this invention has been provided for the purposes of illustration and description. It is not intended to be exhaustive or to limit the invention to the precise embodiments disclosed. Other modifications and variations may be evident to practitioners in the art when considered in reference to this disclosure.

TABLE 1

| Component | Example 1 | Example 2 | Example 3 | Example 4 |
|---|---|---|---|---|
| Thermoplastic polyurethane elastomer (*1) | 80 | 40 | 70 | 50 |
| Thermoplastic polyester elastomer (*2) | 20 | 60 | | |
| Thermoplastic polyester elastomer (*3) | | | 30 | 50 |
| Flame-retardant (30 phr) | None | Bis (brominated phenyl) ethane | | |
| Irradiation dose (kGy) | 200 | 150 | 250 | 200 |
| Combustion test (JAS0 D608) | — | Good | Good | Good |
| Waterproof test | | | | |
| Initial | 5/5 good | 5/5 good | 5/5 good | 5/5 good |
| After heat cycle (100) | 5/5 good | 5/5 good | 5/5 good | 5/5 good |
| After heat cycle (1000) | 2/5 bad | 5/5 good | 5/5 good | 5/5 good |

(*1) Soft segment is polyester based. JIS hardness A85, melt viscosity: 12000 poise (200° C.), glass transition point: −50° C.
(*2) Soft segment is polyether based. Shore hardness D32, melting point: 126° C.
(*3) Soft segment is polyether based. Shore hardness D32, melting point: 140° C.

TABLE 2

| Component | Example 5 | Example 6 | Example 7 | Example 8 |
|---|---|---|---|---|
| Thermoplastic polyurethane elastomer (*1) | 70 | 30 | 20 | 70 |
| Thermoplastic polyester elastomer (*2) | 30 | 70 | | |
| Thermoplastic polyester elastomer (*3) | | | 80 | |
| Thermoplastic polyester elastomer (*4) | | | | 30 |
| Flame-retardant (30 phr) | Ethylene-bis-brominated phthalimide | | Bis (brominated phenyl) terephthalamide | |
| Irradiation dose (kGy) | 250 | 250 | 250 | 250 |
| Combustion test (JAS0 D608) | Good | Good | Good | Good |
| Waterproof test | | | | |
| Initial | 5/5 good | 5/5 good | 5/5 good | 5/5 good |
| After heat cycle (100) | 5/5 good | 5/5 good | 5/5 good | 5/5 good |
| After heat cycle (1000) | 5/5 good | 2/5 bad | 4/5 bad | 5/5 good |

(*1) Soft segment is polyester based. JIS hardness A85, melt viscosity: 12000 poise (200° C.), glass transition point: −50° C.
(*2) Soft segment is polyether based. Shore hardness D32, melting point: 126° C.
(*3) Soft segment is polyether based. Shore hardness D32, melting point: 140° C.
(*4) Soft segment is polyester based. Shore hardness D45, melting point: 205° C.

TABLE 3

| Component | Comparative example 1 | Comparative example 2 | Comparative example 3 | Comparative example 4 |
|---|---|---|---|---|
| Thermoplastic polyurethane elastomer (*1) | 100 | 100 | | |
| Thermoplastic polyurethane elastomer (*2) | | | 100 | |
| Thermoplastic polyurethane elastomer (*3) | | | | 100 |
| Flame-retardant (30 phr) | None | Bis (brominated phenyl) ethane | | |
| Irradiation dose (kGy) | 200 | 200 | 250 | 200 |
| Waterproof test | | | | |
| Initial | 3/5 bad | 4/5 bad | 3/5 bad | 5/5 bad |
| After heat cycle (100) | | | | |
| After heat cycle (1000) | | | | |

(*1) Soft segment is polyester based. JIS hardness A85, melt viscosity: 12000 poise (200° C.), glass transition point: −50° C.
(*2) Soft segment is polyether based. JIS hardness A85, melt viscosity: 12000 poise (200° C.), glass transition point: −55° C.
(*3) Soft segment is polycarbonate ester based. JIS hardness A85, melt viscosity: 12000 poise (200° C.), glass transition point: −35° C.

TABLE 4

| Component | Comparative example 5 | Comparative example 6 | Comparative example 7 | Comparative example 8 |
|---|---|---|---|---|
| Thermoplastic polyester elastomer (*1) | 100 | 100 | | |
| Thermoplastic polyester elastomer (*2) | | | 100 | |
| Thermoplastic polyester elastomer (*3) | | | | 100 |
| Flame-retardant (30 phr) | None | Bis (brominated phenyl) ethane | | |
| Irradiation dose (kGy) | 150 | 250 | 100 | 100 |
| Waterproof test | | | | |
| Initial | 5/5 bad | 5/5 bad | 4/5 bad | 5/5 bad |
| After heat cycle (100) | | | | |
| After heat cycle (1000) | | | | |

(*1) Soft segment is polyether based. Shore hardness D32, melting point: 126° C.
(*2) Soft segment is polyether based. Shore hardness D32, melting point: 140° C.
(*3) Soft segment is polyester based. Shore hardness D45, melting point: 205° C.

TABLE 5

| Component | Example 9 | Example 10 | Comparative example 9 | Comparative example 10 |
|---|---|---|---|---|
| Thermoplastic polyurethane elastomer (*1) | 50 | 50 | 90 | 10 |
| Thermoplastic polyester elastomer (*2) | 50 | | 10 | 90 |
| Thermoplastic polyester elastomer (*3) | | 50 | | |
| Flame-retardant (30 phr) | Octabromo-diphenyl ether | Decabromo-diphenyl ether | Bis (brominated phenyl) ethane | |
| Irradiation dose (kGy) | 200 | 200 | 250 | 250 |
| Waterproof test | | | | |
| Initial | 5/5 good | 5/5 good | 3/5 bad | 4/5 bad |
| After heat cycle (100) | 4/5 bad | 2/5 bad | | |
| After heat cycle (1000) | | | | |

(*1) Soft segment is polyester based. JIS hardness A85, melt viscosity: 12000 poise (200° C.), glass transition point: −50° C.
(*2) Soft segment is polyether based. Shore hardness D32, melting point: 126° C.
(*3) Soft segment is polyether based. Shore hardness D32, melting point: 140° C.

TABLE 6

| Component | Example 11 | Example 12 | Example 13 | Example 14 |
|---|---|---|---|---|
| Thermoplastic polyurethane elastomer (*1) | 80 | 20 | 70 | 50 |
| Thermoplastic polyamide elastomer (*2) | 20 | 80 | | |
| Thermoplastic polyamide elastomer (*3) | | | 30 | 50 |
| Flame-retardant (30 phr) | None | Bis (brominated phenyl) ethane | | |
| Irradiation dose (kGy) | 200 | 150 | 250 | 200 |
| Combustion test (JAS0 D608) | — | Good | Good | Good |
| Waterproof test | | | | |
| Initial | 5/5 good | 5/5 good | 5/5 good | 5/5 good |
| After heat cycle (100) | 5/5 good | 5/5 good | 5/5 good | 5/5 good |
| After heat cycle (1000) | 2/5 bad | 5/5 good | 5/5 good | 5/5 good |

(*1) Soft segment is polyether based. JIS hardness A85, melt viscosity: 12000 poise (200° C.), glass transition point: −50° C.
(*2) Shore hardness D40, melting point: 150° C.
(*3) Shore hardness D64, melting point: 161° C.

TABLE 7

| Component | Example 15 | Example 16 | Example 17 | Example 18 |
|---|---|---|---|---|
| Thermoplastic polyurethane elastomer (*1) | 70 | 20 | 10 | 70 |
| Thermoplastic polyamid elastomer (*2) | 30 | 80 | | |
| Thermoplastic polyamid elastomer (*3) | | | 90 | |
| Thermoplastic polyester elastomer (*4) | | | | 30 |
| Flame-retardant (30 phr) | Ethylene-bis-brominated phthalimide | | Bis (brominated phenyl) terephthalamide | |
| Irradiation dose (kGy) | 250 | 250 | 250 | 250 |
| Combustion test (JAS0 D608) | Good | Good | Good | Good |
| Waterproof test | | | | |
| Initial | 5/5 good | 5/5 good | 5/5 good | 5/5 good |
| After heat cycle (100) | 5/5 good | 5/5 good | 5/5 good | 5/5 good |
| After heat cycle (1000) | 5/5 good | 5/5 good | 4/5 bad | 5/5 good |

(*1) Soft segment is polyether based. JIS hardness A85, melt viscosity: 12000 poise (200° C.), glass transition point: −50° C.
(*2) Shore hardness D40, melting point: 150° C.
(*3) Shore hardness D64, melting point: 161° C.
(*4) Shore hardness D68, melting point: 171° C.

TABLE 8

| Component | Comparative example 11 | Comparative example 12 | Comparative example 13 | Comparative example 14 |
|---|---|---|---|---|
| Thermoplastic polyamide elastomer (*1) | 100 | 100 | | |
| Thermoplastic polyamide elastomer (*2) | | | 100 | |
| Thermoplastic polyamide elastomer (*3) | | | | 100 |

TABLE 8-continued

| Component | Comparative example 11 | Comparative example 12 | Comparative example 13 | Comparative example 14 |
|---|---|---|---|---|
| Flame-retardant (30 phr) | None | Bis (brominated phenyl) ethane | | |
| Irradiation dose (kGy) | 150 | 250 | 100 | 100 |
| Waterproof test | | | | |
| Initial | 3/5 bad | 5/5 bad | 4/5 bad | 5/5 bad |
| After heat cycle (100) | | | | |
| After heat cycle (1000) | | | | |

(*1) Shore hardness D40, melting point: 150° C.
(*2) Shore hardness D64, melting point: 161° C.
(*3) Shore hardness D68, melting point: 171° C.

TABLE 9

| Component | Example 19 | Example 20 | Comparative example 15 | Comparative example 16 |
|---|---|---|---|---|
| Thermoplastic polyurethane elastomer (*1) | 50 | 50 | 90 | 5 |
| Thermoplastic polyamide elastomer (*2) | 50 | | 10 | 95 |
| Thermoplastic polyamide elastomer (*3) | | 50 | | |
| Flame-retardant (30 phr) | Octabromo-diphenyl ether | Decabromo-diphenyl ether | Bis (brominated phenyl) ethane | |
| Irradiation dose (kGy) | 200 | 200 | 250 | 250 |
| Waterproof test | | | | |
| Initial | 5/5 good | 5/5 good | 3/5 bad | 4/5 bad |
| After heat cycle (100) | 4/5 bad | 2/5 bad | | |
| After heat cycle (1000) | | | | |

(*1) Soft segment is polyether based. JIS hardness A85, melt viscosity: 12000 poise (200° C.), glass transition point: −50° C.
(*2) Shore hardness D40, melting point: 150° C.
(*3) Shore hardness D64, melting point: 161° C.

TABLE 10

| Component | Example 21 | Example 22 | Example 23 | Example 24 |
|---|---|---|---|---|
| Thermoplastic polyurethane elastomer (*1) | 80 | 40 | 70 | 50 |
| Thermoplastic polyester elastomer (*2) | 20 | 60 | | |
| Thermoplastic polyester elastomer (*3) | | | 30 | 50 |
| Flame-retardant (30 phr) | None | Bis (brominated phenyl) ethane | | |
| Irradiation dose (kGy) | 200 | 150 | 250 | 200 |
| Combustion test (JAS0 D608) | — | Good | Good | Good |
| Waterproof test | | | | |
| Initial | 5/5 good | 5/5 good | 5/5 good | 5/5 good |
| After heat cycle (100) | 5/5 good | 5/5 good | 5/5 good | 5/5 good |
| After heat cycle (300) | 5/5 good | 5/5 good | 5/5 good | 5/5 good |
| After heat cycle (500) | 5/5 good | 5/5 good | 5/5 good | 5/5 good |
| After heat cycle (1000) | 2/5 bad | 5/5 good | 5/5 good | 5/5 good |

(*1) Soft segment is polyether based. JIS hardness A85, melt viscosity: 12000 poise (200° C.), glass transition point: −50° C.
(*2) Soft segment is polyether based. Shore hardness D32, melting point: 126° C.
(*3) Soft segment is polyether based. Shore hardness D32, melting point: 140° C.

TABLE 11

| Component | Example 25 | Example 26 | Example 27 | Example 28 |
|---|---|---|---|---|
| Thermoplastic polyurethane elastomer (*1) | 70 | 30 | 20 | 70 |
| Thermoplastic polyester elastomer (*2) | 30 | 70 | | |
| Thermoplastic polyester elastomer (*3) | | | 80 | |
| Thermoplastic polyester elastomer (*4) | | | | 30 |
| Flame-retardant (30 phr) | Ethylene-bis-brominated phthalimide | | Bis (brominated phenyl) terephthalamide | |
| Irradiation dose (kGy) | 250 | 250 | 250 | 250 |
| Combustion test (JAS0 D608) | Good | Good | Good | Good |
| Waterproof test | | | | |
| Initial | 5/5 good | 5/5 good | 5/5 good | 5/5 good |
| After heat cycle (100) | 5/5 good | 5/5 good | 5/5 good | 5/5 good |
| After heat cycle (300) | 5/5 good | 5/5 good | 5/5 good | 5/5 good |
| After heat cycle (500) | 5/5 good | 5/5 good | 5/5 good | 5/5 good |
| After heat cycle (1000) | 5/5 good | 1/5 bad | 2/5 bad | 5/5 good |

(*1) Soft segment is polyether based. JIS hardness A85, melt viscosity: 12000 poise (200° C.), glass transition point: −50° C.
(*2) Soft segment is polyether based. Shore hardness D32, melting point: 126° C.
(*3) Soft segment is polyether based. Shore hardness D32, melting point: 140° C.
(*4) Soft segment is polyester based. Shore hardness D45, melting point: 205° C.

TABLE 12

| Component | Comparative example 17 | Comparative example 18 | Comparative example 19 | Comparative example 20 |
|---|---|---|---|---|
| Thermoplastic polyurethane elastomer (*1) | 100 | 100 | | |
| Thermoplastic polyurethane elastomer (*2) | | | 100 | |
| Thermoplastic polyurethane elastomer (*3) | | | | 100 |
| Flame-retardant (30 phr) | None | Bis (brominated phenyl) ethane | | |

TABLE 12-continued

| Component | Comparative example 17 | Comparative example 18 | Comparative example 19 | Comparative example 20 |
|---|---|---|---|---|
| Irradiation dose (kGy) | 200 | 200 | 250 | 200 |
| Waterproof test | | | | |
| Initial | 2/5 bad | 3/5 bad | 3/5 bad | 4/5 bad |
| After heat cycle (100) | | | | |
| After heat cycle (300) | | | | |
| After heat cycle (500) | | | | |
| After heat cycle (1000) | | | | |

(*1) Soft segment is polyether based. JIS hardness A85, melt viscosity: 12000 poise (200° C.), glass transition point: −50° C.
(*2) Soft segment is polyester based. JIS hardness A85, melt viscosity: 12000 poise (200° C.), glass transition point: −55° C.
(*3) Soft segment is polycarbonate ester based. JIS hardness A85, melt viscosity: 12000 poise (200° C.), glass transition point: −35° C.

TABLE 13

| Component | Comparative example 21 | Comparative example 22 | Comparative example 23 | Comparative example 24 |
|---|---|---|---|---|
| Thermoplastic polyester elastomer (*1) | 100 | 100 | | |
| Thermoplastic polyester elastomer (*2) | | | 100 | |
| Thermoplastic polyester elastomer (*3) | | | | 100 |
| Flame-retardant (30 phr) | None | Bis (brominated phenyl) ethane | | |
| Irradiation dose (kGy) | 150 | 250 | 100 | 100 |
| Waterproof test | | | | |
| Initial | 5/5 good | 5/5 good | 5/5 good | 5/5 good |
| After heat cycle (100) | 5/5 good | 5/5 good | 5/5 good | 5/5 good |
| After heat cycle (300) | 5/5 good | 5/5 good | 5/5 good | 5/5 good |
| After heat cycle (500) | 2/5 bad | 2/5 bad | 3/5 bad | 4/5 bad |
| After heat cycle (1000) | | | | |

(*1) Soft segment is polyether based. Shore hardness D32, melting point: 126° C.
(*2) Soft segment is polyester based. Shore hardness D32, melting point: 140° C.
(*3) Soft segment is polyester based. Shore hardness D45, melting point: 205° C.

TABLE 14

| Component | Example 29 | Example 30 | Example 31 | Example 32 |
|---|---|---|---|---|
| Thermoplastic polyurethane elastomer (*1) | 50 | 50 | | |
| Thermoplastic polyurethane elastomer (*2) | | | 50 | 50 |
| Thermoplastic polyester elastomer (*3) | 50 | | 50 | |
| Thermoplastic polyester elastomer (*4) | | 50 | | 50 |
| Flame-retardant (30 phr) | Octabromo-diphenyl ether | Decabromo-diphenyl ether | Octabromo-diphenyl ether | Decabromo-diphenyl ether |
| Irradiation dose (kGy) | 200 | 200 | 250 | 250 |
| Waterproof test | | | | |
| Initial | 5/5 good | 5/5 good | 5/5 good | 5/5 good |
| After heat cycle (100) | 4/5 bad | 2/5 bad | 3/5 bad | 3/5 bad |
| After heat cycle (300) | | | | |
| After heat cycle (500) | | | | |
| After heat cycle (1000) | | | | |

(*1) Soft segment is polyether based. JIS hardness A85, melt viscosity: 12000 poise (200° C.), glass transition point: −50° C.
(*2) Soft segment is polyester based. JIS hardness A85, melt viscosity: 12000 poise (200° C.), glass transition point: −55° C.
(*3) Soft segment is polyether based. Shore hardness D32, melting point: 126° C.
(*4) Soft segment is polyester based. Shore hardness D45, melting point: 205° C.

TABLE 15

| Component | Comparative example 25 | Comparative example 26 |
|---|---|---|
| Thermoplastic polyurethane elastomer (*1) | 90 | 10 |
| Thermoplastic polyester elastomer (*2) | 10 | 90 |
| Flame-retardant (30 phr) | Bis (brominated phenyl) ethane | Bis (brominated phenyl) ethane |
| Irradiation dose (kGy) | 250 | 250 |
| Initial | 5/5 good | 5/5 good |
| After heat cycle (100) | 5/5 good | 5/5 good |
| After heat cycle (300) | 5/5 good | 5/5 good |
| After heat cycle (500) | 3/5 bad | 2/5 bad |
| After heat cycle (1000) | | |

(*1) Soft segment is polyether based. JIS hardness A85, melt viscosity: 12000 poise (200° C.), glass transition temperature: −50° C.
(*2) Soft segment is polyether based. Shore hardness D32, melting point: 126° C.

What is claimed is:

1. An electrically insulated cable having single core or multi-core insulated wires, comprising:
   at least one conductor element;
   an insulating member covering said at least one conductor element; and
   a sheath provided around said at least one conductor element covered by said insulating member, said sheath being made from a crosslinked resin composition comprising as a main component a mixture of a thermoplastic polyurethane elastomer and a thermoplastic polyester elastomer mixed together in a weight ratio of 80:20 to 20:80, wherein said thermoplastic polyester elastomer is a block copolymer of a crystalline hard segment and a polyether-based amorphous soft segment.

2. An electrically insulated cable as claimed in claim 1, wherein said resin composition is flame-retarded by addition of a flame-retardant other than polybromodiphenyl ether.

3. An electrically insulated cable as claimed in claim 2, wherein said flame-retardant is one selected from a group consisting of ethylene-bis-brominated phthalimide, bis(brominated phenyl) ethane, and bis(brominated phenyl) terephthalamide, or a mixture thereof.

4. An electrically insulated cable as claimed in claim 1, 2 or 3, wherein said cable is connected at one end thereof to a device and to a housing made by injection molding a polyamide resin or a polyester resin sealing said device therein by fusing airtight said housing to said sheath of said cable at said one end.

5. An electrically insulated cable having a sheath, comprising:
- at least one conductor element;
- an insulating member covering said at least one conductor element; and
- a sheath provided around said at least one conductor element covered by said insulating member, said sheath at one end of said cable being sealed by injection molding of a polyamide resin or a polyester resin, said sheath being made from a crosslinked resin composition comprising as a main component a mixture of a thermoplastic polyurethane elastomer and a thermoplastic polyester elastomer mixed together in a weight ratio of 80:20 to 20:80, wherein said thermoplastic polyester elastomer is a block copolymer of a crystalline hard segment and a polyether-based amorphous soft segment.

6. An electrically insulated cable as claimed in claim 5, wherein said resin composition is flame-retarded by addition of a flame-retardant other than polybromodiphenyl ether.

7. An electrically insulated cable as claimed in claim 6, wherein said flame-retardant is one selected from a group consisting of ethylene-bis-brominated phthalimide, bis(brominated phenyl) ethane, and bis(brominated phenyl) terephthalamide, or a mixture thereof.

8. An electrically insulated cable as claimed in claim 5, 6 or 7, wherein said cable is connected at one end thereof to a device and to a housing made by injection molding a polyamide resin or a polyester resin sealing said device therein by fusing airtight said housing to said sheath of said cable at said one end.

* * * * *